Oct. 10, 1961  R. G. FRASHOUR ET AL  3,003,205
COMPOSITE BEVEL SIDING AND METHOD FOR ITS FABRICATION
Filed July 10, 1957
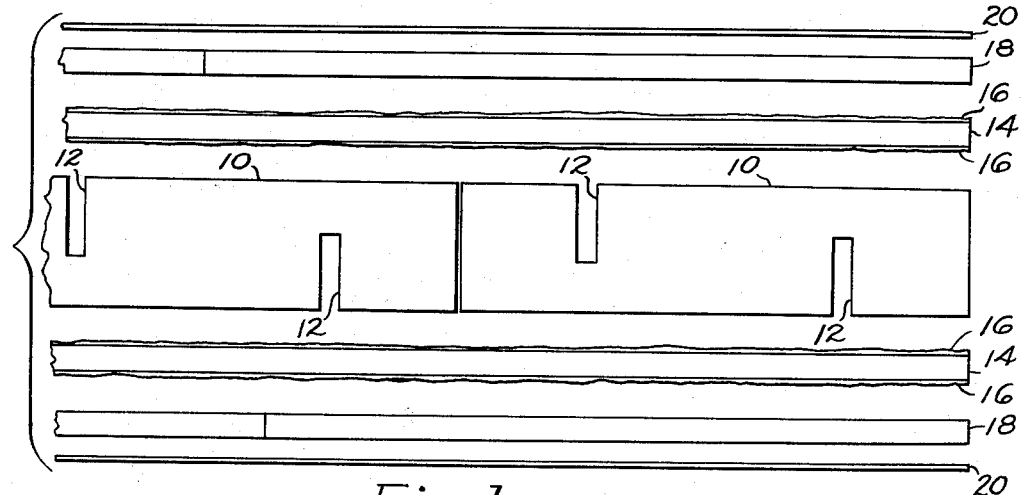
Fig. 1.
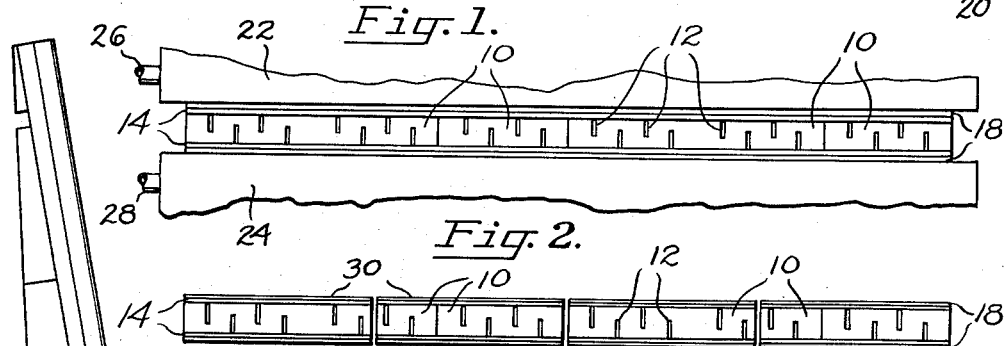
Fig. 2.
Fig. 3.
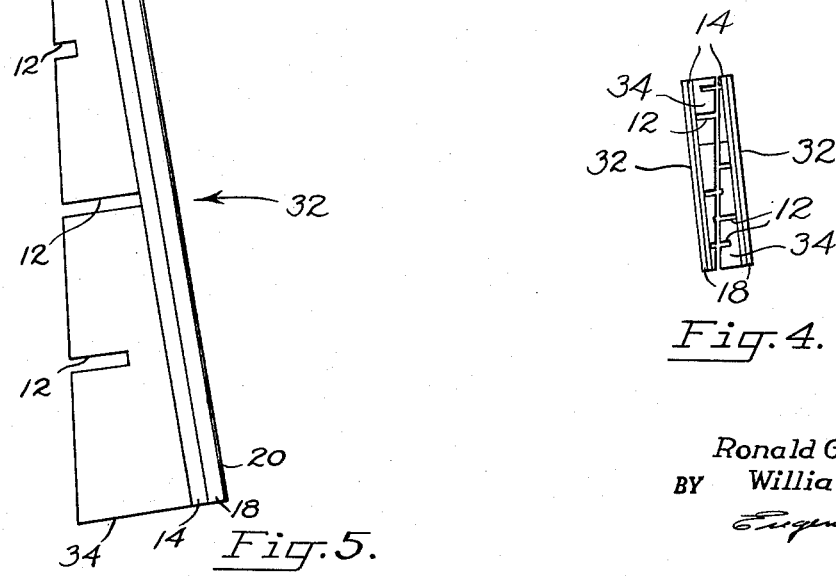
Fig. 4.
Fig. 5.
INVENTORS
Ronald G. Frashour
BY William H. Cooke
Atty.

United States Patent Office 3,003,205
Patented Oct. 10, 1961

3,003,205
COMPOSITE BEVEL SIDING AND METHOD
FOR ITS FABRICATION
Ronald G. Frashour and William H. Cooke, Roseburg, Oreg., assignors to State of Oregon, acting by and through the Oregon State Board of Forestry
Filed July 10, 1957, Ser. No. 670,893
6 Claims. (Cl. 20—91)

This invention relates to a composite bevel siding suitable for use as house siding, and to a method for its fabrication.

The present invention is a result of and provides a solution for a two-fold problem which currently plagues the lumber industry. The first aspect of the problem is the need for a dimensionally stable, competitive, uniform length bevel siding product that can be installed easily without special accessories, and having a smooth, durable surface with exceptional paint holding properties. The second is the need for finding outlets for common grade lumber, a large proportion of which necessarily is produced in ordinary sawmill operations. Such lumber currently is in long supply because its traditional markets in sheathing, sub-flooring and concrete form lumber are being lost in substantial measure to competitive building materials such as plywood and other panel products.

Accordingly it is the general object of the present invention to provide a superior composite bevel siding which employs common grade lumber as a primary component.

It is another object of the present invention to provide a composite bevel siding which is dimensionally stable.

It is another object of the present invention to provide a composite bevel siding which when painted substantially eliminates paint blistering resulting from water vapor movement.

It is another object of the present invention to provide a composite bevel siding which is relatively light in weight and hence may be shipped at reduced cost.

It is another object of the present invention to provide a composite bevel siding which possesses a smooth, durable surface with exceptional paint holding properties.

It is another object of the present invention to provide a composite bevel siding which will not split during application.

It is another object of the present invention to provide a composite bevel siding which may be applied directly to the studs without the necessity for interposing sheathing.

It is another object of the present invention to provide a composite bevel siding which requires but a relatively short press cycle for its production.

It is another object of the present invention to provide a composite bevel siding which is relatively low in cost.

Still a further object of this invention is the provision of a method for producing a composite bevel siding having the foregoing desirable attributes.

The manner in which the foregoing and other objects of this invention are accomplished will be apparent from the accompanying specification and claims considered together with the drawings, wherein like numerals of reference are used to indicate like parts and wherein:

FIGURE 1 is a composite view of an assembly which may be employed for producing the herein described composite bevel siding;

FIGURE 2 is a fragmentary view in end elevation illustrating the assembly of FIGURE 1 being consolidated in a hot press;

FIGURE 3 is a view in end elevation of the consolidated assembly of FIGURE 2 after it has been rip sawn into widths corresponding to the widths of the siding which it is desired to produce;

FIGURE 4 is a view in end elevation of one of the units illustrated in FIGURE 3 after it has been bevel sawn to form two pieces of siding; and FIGURE 5 is a view in end elevation of one of the bevel siding pieces of FIGURE 4, substantially enlarged to illustrate its construction.

Broadly stated, the presently described composite bevel siding comprises a beveled lumber base having spaced longitudinal slots in its inner face, and at least one sheet of wood veneer glued to its outer face. Such a product is produced by a method which, generally stated, comprises grooving the opposite faces of boards with spaced, longitudinally arranged grooves; forming an assembly comprising a plurality of the grooved boards juxtaposed side by side and sheets of glue-covered wood veneer on each face of the boards; pressing the assembly for consolidating it and for gluing the veneer sheets to the faces of the grooved boards; dividing the resulting composite panel into lengths of siding width, and bevel sawing the grooved lumber base of said lengths to produce a beveled siding product.

Considering the foregoing in greater detail and with particular reference to the drawings:

The lumber base or core material employed as a primary component of the hereindescribed composite bevel siding comprises a plurality of boards 10 juxtaposed side by side until a core assembly of the desired width is produced. A suitable width might be, for example, from two to four feet and the component boards might have lengths of up to 20 feet or more. As noted above, the boards used for the core may be of common grade and possess in substantial measure such defects as large knots and knot holes, excessive wane, roller splits, worm holes, rot and stain. The boards may be dried by any method with or without relieving the stresses developed during drying. They need not be resurfaced and need not be edge glued to form a continuous panel. Their moisture content may vary from 0 to 25% but preferably is from 0 to 15% by weight.

As has been pointed out, the core boards may be common grade lumber and, as is well known, lumber is conventionally cut with the grain parallel to the length of the boards. Therefore, when the boards 10 are juxtaposed side by side, they are arranged in a generally parallel grain relationship.

Preliminary to including them in the core, the boards first are grooved longitudinally on both faces to a substantial depth, e.g. to a depth of about ½ their thickness. The grooves 12 are spaced apart from 1 to 4 inches, preferably about 1½ to 2 inches, and serve dual purposes. First, they permit the escape of moisture during the ensuing hot pressing operation. Second, they compensate for moisture changes within the siding pieces so that subsequent cupping and warping are practically eliminated.

Superimposed on both faces of the grooved lumber core are one or more layers of wood veneer. In the illustrated and preferred embodiment, there first is applied to each face of the core a lamina of cross band veneers 14. These may comprise conventional rotary peeled, low quality, cross band veneers having thicknesses of about ⅒ inch.

Preliminary to including them in the assembly, both faces of cross band veneers 14 are covered with suitable glue coatings 16, preferably by running them through a conventional plywood glue spreader. The glue employed preferably is an exterior grade, phenol-formaldehyde, thermosetting resin glue of the class employed for gluing together wood veneers in the production of plywood. It also may comprise an exterior type cold-setting adhesive product such as a suitably formulated resorcinol-formaldehyde glue. The glue application may be within the range of from 20–40 pounds, preferably about 30 pounds, per 1000 square feet of single glue line.

The next layer of the unconsolidated assembly comprises the wood face veneers 18 which, like the cross band veneers, may comprise rotary peeled plywood veneers about 1/10 inch thick. However, the face veneers should be smooth and of good quality, with well-fitted veneer patches, since the use of veneers with rough grain and poorly-fitted patches results in a product characterized by show-through of these defects. Preferably also the face veneers should be edge glued preliminary to application since otherwise the joints between the veneer pieces tend to show through the overlay material.

The overlay material which is used to impart to the final product a smooth, attractive durable surface that holds paint well without blistering or peeling, comprises a paper or fiber sheet 20 embodying a thermosetting synthetic resin. A particularly suitable overlay paper for this use is the medium-density paper product marketed by Crown Zellerbach Corporation under the trademark Crezon.

This product includes 17–19% by weight of a thermosetting phenol-formaldehyde resin incorporated by being added to the pulp at the beater. The paper is supplied with a pre-applied phenolic glue line of 8½ pounds per 1000 square feet, this being equal to a standard exterior phenolic plywood glue line of 60 pounds per 1000 square feet, double spread. The paper weighs 67 pounds per 1000 square feet and is 0.018 inch thick before pressing.

As a result, there is produced a symmetrical assembly such as is illustrated in FIGURE 1 which may be, for example, from 1–6 feet wide and of any desired length, for example, from 8–16 feet. This assembly is placed in a hot press such as is illustrated schematically in FIGURE 2, the platens 22, 24 of the press being heated by suitable means such as steam or hot water supplied through conduits 26, 28 respectively so that they may be heated to the temperature required for setting the glue.

Depending upon the glue employed, the assembly then may be pressed cold or at elevated temperature and pressure. If it is pressed hot, a press temperature of from 230–400 degrees F. is usually sufficient to set the glue, to cure paper overlays 20, and to bond them to the underlying face veneers.

The pressing pressure likewise is variable as required by the identity, number and thickness of the woody constituents of the assembly, and by the particular thermosetting resin glue employed. In general, pressures in the range of from 100–300 p.s.i. are applicable.

Press times are determined by the foregoing variables of identity, thickness and number of the woody constituents; and the identity of the glue employed. However, in general, the assembly is held under pressure for a time sufficient to heat the innermost glue line to a glue-setting temperature and substantially cure it. In the usual case, a press time of from 5–15 minutes suffices. It is to be noted that the press time is substantially lower than would be expected, because the grooves in the lumber base or core facilitate the escape of moisture from the assembly. Accordingly the production rate of a press of given capacity is substantially increased.

Thus in a typical instance an assembly including common ponderosa pine core lumber about three-quarters inch thick having a moisture content of from 8–12%, cross band and face veneers each 0.1 inch thick, an application on both sides of the cross band veneer of American Marietta's Amres 5580 exterior phenolic plywood resin, and the above described Crezon paper overlay, may be pressed satisfactorily at a press temperature of about 290 degrees F., a pressure of about 200 p.s.i., and a press time of about 9 minutes, the temperature of the innermost glue line being elevated within this period to a level of 220 degrees F.

After removal from the hot press, the resulting composite panel is cooled and then subdivided by rip sawing or otherwise, lengthwise of the grain of the core members, into units having the width desired in the finished siding. Such units are indicated at 30 in FIGURE 3.

The composite units thus formed then are bevel sawn in the manner indicated in FIGURE 4 to produce the finished siding panels 32. The amount of bevel is variable, but should produce a feather edge sufficient to produce a stable product, and a butt edge sufficiently thick to give the desired shadow line. In general, where the composite pressed unit before sawing is about 1 1/16 inches thick, a feather edge which is about ¼ inch thick and a butt edge which is about ¾ inch thick are suitable.

The final siding piece 32 is illustrated in FIGURE 5. It comprises the bevel sawn lumber base 34 derived from original core 10 containing longitudinal grooves 12. Glued to the outer face of the bevelled core in the order named are cross band veneer 14, face veneer 18, and resin paper overlay 20. This forms a composite siding member which is light in weight and very resistant to warping and cupping. Furthermore, the paper overlay surface masks the defects of the underlying veneer and affords a smooth, durable surface that may be painted effectively.

It is to be understood that the form of our invention herein shown and described is to be taken as a preferred example of the same and that various changes in the shape, size and arrangement of parts may be resorted to without departing from the spirit of our invention or the scope of the subjoined claims.

Having thus described our invention, we claim:

1. A composite bevel siding comprising a core member formed of elongated boards disposed longitudinally of the siding in side by side parallel grain relation, the core member having a lateral taper and having first and second face surfaces forming the taper, the first and second face surfaces each being provided with laterally spaced longitudinal slots substantially the full length of the face surfaces and having an inward direction normal to the longitudinal plane of one of the face surfaces, at least one of the slots extending through the core member between the first and second face surfaces, a first wood veneer layer overlying one of the face surfaces with the grain of the wood veneer layer being crosswise to the grain of the core member, a second wood veneer layer overlying the first wood veneer layer with the grain thereof substantially parallel to the grain of the core member, and glue layers on opposite sides of the first wood veneer layer integrally uniting the core member and the first and second wood veneer layers, thereby forming a structurally stable bevel siding of truncated triangular shape in cross section.

2. The bevel siding of claim 1 wherein the water resistant glue comprises a phenolic resin glue.

3. The bevel siding of claim 1 including a paper face sheet adhesively united to the second wood veneer layer.

4. A method of manufacturing a composite bevel siding comprising cutting laterally spaced longitudinal slots in the opposite faces of wood boards to a depth of about one-half the thickness of the boards, arranging a plurality of the slotted boards in side by side parallel grain relationship to form a core, placing cross band wood veneers across both faces of the core, placing a sheet of wood face veneer over each cross band veneer, interposing adhesive between the abutting surfaces of the veneers and between the abutting surfaces of the veneers and the core, setting the adhesive to consolidate the assembly of the core and veneers, cutting the core of the consolidated assembly diagonally edgewise between the veneers to intersect some of the longitudinal slots and produce a pair of bevel siding panels each of which has a tapered core with laterally spaced longitudinal slots extending inwardly from the inner and outer faces of the core with at least one of the slots extending through the core member between the inner and outer faces.

5. A method of manufacturing a composite bevel siding comprising cutting laterally spaced longitudinal slots in the opposite faces of wood boards to a depth of about one-half the thickness of the boards, arranging a plurality of the slotted boards in side by side parallel grain relationship to form a core, placing cross band wood veneers across both faces of the core, placing a sheet of wood face veneer over each cross band veneer, interposing adhesive between the abutting surfaces of the veneers and between the abutting surfaces of the veneers and the core, setting the adhesive to consolidate the assembly of the core and veneers, dividing the consolidated assembly lengthwise of the core boards into pieces of predetermined width, cutting the core of each piece diagonally edgewise between the veneers to intersect some of the longitudinal slots and produce a pair of bevel siding panels each of which has a tapered core with laterally spaced longitudinal slots extending inwardly from the inner and outer faces of the core with at least one of the slots extending through the core member between the inner and outer faces.

6. A method of manufacturing a composite bevel siding as defined in claim 5 wherein a paper face sheet is adhesively united to the outer surface of each wood face veneer of the assembly prior to dividing the consolidated assembly lengthwise of the core boards.

References Cited in the file of this patent

UNITED STATES PATENTS

| | | |
|---|---|---|
| 382,852 | Apoll | May 15, 1888 |
| 2,342,490 | Pretot | Feb. 22, 1944 |
| 2,354,725 | Weyerhaeuser | Aug. 1, 1944 |
| 2,565,251 | Malmstrom | Aug. 21, 1951 |
| 2,569,831 | Ryall | Oct. 2, 1951 |
| 2,772,197 | Kozdemba | Nov. 27, 1956 |
| 2,830,004 | Lyons | Apr. 8, 1958 |

FOREIGN PATENTS

| | | |
|---|---|---|
| 586,529 | Great Britain | Mar. 21, 1947 |
| 647,868 | Great Britain | Dec. 20, 1950 |
| 240,737 | Switzerland | June 1, 1946 |